(12) United States Patent
Messner

(10) Patent No.: US 6,979,188 B2
(45) Date of Patent: Dec. 27, 2005

(54) EXTRUSION HEAD FOR PRODUCING A PLASTIC STRAND IN THE FORM OF A FLEXIBLE OR RIGID TUBE

(75) Inventor: Wolfgang Messner, Absam (AT)

(73) Assignee: Soplar SA, Altstatten (CH)

( * ) Notice: Subject to any disclaimer, the term of this patent is extended or adjusted under 35 U.S.C. 154(b) by 174 days.

(21) Appl. No.: 10/701,458

(22) Filed: Nov. 6, 2003

(65) Prior Publication Data
US 2004/0091564 A1 May 13, 2004

Related U.S. Application Data

(63) Continuation of application No. PCT/CH02/00188, filed on Apr. 4, 2002.

(30) Foreign Application Priority Data
May 7, 2001 (CH) .................................. 0826/01

(51) Int. Cl.⁷ .................... B29C 47/22; B29C 49/04
(52) U.S. Cl. ................. 425/192 R; 425/381; 425/532; 425/538
(58) Field of Search ................. 425/192 R, 381, 425/466, 532, 538, 133.1; 264/540, 542

(56) References Cited

U.S. PATENT DOCUMENTS 3,205,534 A 9/1965 Langecker
3,355,763 A 12/1967 Willert
3,918,874 A * 11/1975 Dybala et al. .............. 425/381
3,943,214 A 3/1976 Turek
5,356,282 A * 10/1994 Throne et al. .............. 425/381
5,792,486 A * 8/1998 Hsu ....................... 425/192 R

FOREIGN PATENT DOCUMENTS

| EP | 0491093 A1 * | 6/1992 | ........... B29C 47/22 |
| FR | 1 500 288 A | 1/1968 | |
| FR | 2 781 409 A1 | 1/2000 | |
| JP | 62148214 A | 7/1987 | |

* cited by examiner

Primary Examiner—Robert B. Davis
(74) Attorney, Agent, or Firm—Buchanan Ingersoll PC

(57) ABSTRACT

An exemplary extrusion head for producing a plastic strand in the form of a flexible or rigid tube can be made to communicate with the outlet of an extruder and has a nozzle tool, which includes a mandrel, or core, and a nozzle ring. The mandrel and the nozzle ring define an opening gap, whose opening width is variable by means of an axial relative motion (A, B) between the core and the nozzle ring that can be controlled via an electric or hydraulic actuating drive. The extrusion head includes a suspension element and an extrusion element, detachably connected to it, which has all the connections and flow channels for the composition to be extruded and is equipped with the nozzle tool. The actuating drive is disposed on the suspension element and can be connected detachably to the mandrel or to the nozzle ring.

10 Claims, 2 Drawing Sheets

EXTRUSION HEAD FOR PRODUCING A PLASTIC STRAND IN THE FORM OF A FLEXIBLE OR RIGID TUBE

CROSS REFERENCE TO RELATED APPLICATIONS

This application claims priority under 35 U.S.C. §119 to Swiss Application 826/01 filed in Switzerland on 7 May 2001, and as a continuation application under 35 U.S.C. §120 to PCT/CH02/00188 filed as an International Application on 4 Apr. 2002 designating the U.S., the entire contents of which are hereby incorporated by reference in their entireties.

BACKGROUND

The invention relates to an extrusion head for producing a plastic strand in the form of a flexible or rigid tube. The invention also relates to an extrusion blow molding machine equipped with an extrusion head.

The usual containers of the past, made of tin plate, nonferrous sheet metal, glass, or even ceramic, are increasingly being replaced with containers of plastic. Particularly for packaging fluid substances such as beverages or oil, cleaning utensils, cosmetics, and so forth, plastic containers are used primarily. In this substitution, the low weight and lower costs surely play a not inconsiderable role. The use of recyclable plastic materials, which can be produced with more-favorable overall energy consumption, also helps promote consumer acceptance of plastic containers, and especially plastic bottles.

Plastic containers and especially plastic bottles, for instance of polyethylene or polypropylene, are produced by the extrusion blow molding process, and especially a process for blow molding flexible tubes. First, with the aid of an extrusion head, a one- or multi-layer flexible plastic tube in the form of a flexible or rigid tube is extruded, for example, from thermoplastic. A continuously extruded flexible plastic tube-is placed in a blow molding tool, cut off, blown over a blow molding mandrel by overpressure, and cured by cooling. The extrusion blow molding machines used for this purpose as a rule have at least one extruder for delivering the plastic material to the extrusion head. The outlet of the extruder communicates with the extrusion head, which has at least one extrusion nozzle the opening width of which can be regulated. For the sake of continuous operation, in the known extrusion blow molding machines two stations with blow molds are provided, which are served in alternation by the extrusion head. The blow molding stations are disposed opposite one another on both sides of the extruder and have blow molding tables that are moved to beneath the extrusion head in alternation in order to receive the extruded flexible tube. Overall, the extruder with the extrusion head and the two blow molding stations is approximately T-shaped. The extruder and the extrusion head form the long bar of the T, while the two blow molding tables are movable in alternation along the short halves of the crossbar to beneath the extrusion head.

The extrusion head communicates with the outlet of the extruder and is supplied by it with, for example, the thermoplastic material. At least one extrusion nozzle is provided on the extrusion head. Often, the extrusion head is equipped with a plurality of extrusion nozzles, so that in a single operation, a plurality of flexible plastic tubes can be produced simultaneously and taken over by a multiple blow molding tool. Each extrusion nozzle has a nozzle tool, which has a central mandrel and a nozzle ring surrounding the mandrel. The annular gap defined by the jacket of the mandrel and the inside surface of the nozzle ring forms the outlet opening of the extrusion nozzle. The mandrel typically has a shape that widens or narrows conically toward its free end. The inside face of the nozzle ring is typically also a conical jacket face. The angle of inclination of the inside face of the nozzle ring relative to the mandrel axis differs from the angle of inclination of the jacket face of the mandrel. By means of an axial relative motion between the mandrel and the nozzle ring, the opening width of the outlet opening can be varied, and as a result the wall thickness of the extruded flexible plastic tube can be controlled. The relative motion is usually effected by means of raising and lowering the mandrel relative to the immovably disposed nozzle ring. In the prior art, embodiments are also known in which the nozzle ring is axially movable, while the mandrel is fixed.

For the axial relative motion between the mandrel and the nozzle ring, a hydraulic or electric actuating drive is provided, by way of which the relative motion can be performed in accordance with predetermined criteria. The actuating drive cooperates with the mandrel or the nozzle ring to regulate the opening width of the outlet opening and as a result to modify the wall thickness of the extruded flexible plastic tube as specified. Given the mass that has to be moved, particularly upon an adjustment in height of the nozzle ring, and in view of the speed and precision of the adjustment, the motors and gears used for the actuating drive are relatively complicated and expensive. It is often necessary to change the extrusion head, for instance in order to adapt the extrusion blow molding machine to different plastics, or to change from a single-layer extrusion head to a multi-layer extrusion head, or to adapt the extrusion head to different shapes of container, different blow molding tools, and the like. The extrusion heads known from the prior art are embodied as a structural unit, which can be replaced only in its entirety. In the known extrusion blow molding machines, it is therefore necessary for the entire extrusion head, with the nozzle tool and actuating drive, to be unflanged from the extruder and replaced with a new extrusion head. The newly installed extrusion head must then be adapted to the altered conditions and recalibrated in its entirety. Taking the enormous weight of the extrusion head into account, it is immediately apparent that replacing and calibrating the entire extrusion head is a very time-consuming and labor-intensive process. The actuating drive for the nozzle tool is a fixed component of the tubing heads known from the prior art and is not a negligible expense item involved in changing the extrusion head. Moreover, when the known tubing heads are changed, the hydraulic and/or electrical installations for the actuating drive must be redone, to assure reliable operation of the thus altered extrusion blow molding machine.

SUMMARY

The present invention is, for example, directed to overcoming disadvantages of the extrusion blow molding machines of the prior art. Exemplary embodiments can simplify the change of an extrusion head in an extrusion blow molding machine. Exemplary embodiments also make it possible to avoid complicated calibration operations. The extrusion head can be modified such that a change can be made faster and at less effort and less expense.

Exemplary embodiments include an extrusion head for producing a plastic strand in the form of a rigid or flexible tube.

An exemplary extrusion head of the invention for producing a plastic strand in the form of a flexible or rigid tube can be made to communicate with the outlet of an extruder and has a nozzle tool, which includes a core and a nozzle ring. The core and the nozzle ring define an opening gap, whose opening width is variable by means of an axial relative motion between the core and the nozzle ring that can be controlled via an electric or hydraulic actuating drive. The extrusion head includes a suspension element and an extrusion element, detachably connected to it, which has all the connections and flow channels for the composition to be extruded and is equipped with the nozzle tool. The actuating drive is disposed on the suspension element and can be connected detachably to the mandrel or to the nozzle ring.

By dividing up the extrusion head into a suspension element and an extrusion element, a simplified replacement is created. The extrusion element is detachably connected to the suspension element. As a result, when a change is made, it is no longer necessary for the entire extrusion head to be removed and replaced. It suffices to detach the extrusion element from the suspension element and to replace only the extrusion element. All the connections and flow channels for the composition to be extruded and the nozzle tool are provided on the replaceable extrusion element. Thus, upon replacement of the extrusion element, it is no longer necessary to recalibrate the nozzle tool in order to adjust the requisite flow quantities. The channels for the flowable plastic composition and the nozzle tool can be always adapted optimally to one another. The replacement can also be accomplished much more simply, since because the extrusion head is divided into a suspension element and the extrusion element, the weight of the part to be replaced is reduced markedly. Since the actuating drive for adjusting the opening width of the annular gap of the nozzle tool is disposed on the suspension element, it is retained when the extrusion element is replaced. This not only reduces the weight but has a commercial advantage. When the extrusion element is changed, only mechanical connections have to be made. Making additional hydraulic and/or electrical connections for the actuating drive, which can also be a source of mistakes, is no longer necessary.

For adjusting the wall thickness of the extruded flexible plastic tube, the opening gap of the nozzle tool is adjustable in its width. This is done by an axial relative motion between the mandrel and the nozzle ring. While adjusting the width can in principle also be done by adjusting the nozzle ring relative to a mandrel mounted in fixed fashion on the extrusion element, in an exemplary variant of the invention, the mandrel is the axially adjustable nozzle member. To that end, the mandrel is connected to a control rod, which cooperates with the actuating drive and assures an axial adjustment of the mandrel relative to the fixed nozzle ring. The control rod is advantageously disposed in axial extension of the mandrel and is guided by the extrusion element. The control rod is actuatable via the actuating drive in order to raise and lower the mandrel relative to the nozzle ring and thereby to adjust the opening width of the opening gap of the nozzle tool.

To enable very simple replacement of the extrusion element as needed and on the other hand to assure reliable cooperation of the actuating drive and the control rod, the connection between the suspension element and the extrusion element on the one hand and between the actuating drive and the control rod on the other is embodied as a positive-engagement connection. It proves especially expedient if the connections are embodied as rails meshing with one another, or similar connection parts embodied accordingly.

For coupling the control rod to the actuating drive, a positive-engagement connection by way of two meshing, approximately L-shaped control bars proves to be quite expedient. The positive-engagement connection via approximately L-shaped control bars is advantageous in terms of installation especially for an extrusion element having a plurality of nozzle tools. A number of control rods that corresponds to the number of nozzle tools is mounted on the control bar toward the extrusion element. The coupling of the control rods to the actuating drive is effected via the common control bar. Since the various nozzle tools all simultaneously extrude identical flexible plastic tubes, it suffices to adjust the control bar axially in height in order thereby to adjust the opening width to the desired extent for all the nozzle tools.

In a very simple, expedient variant embodiment of the nozzle tool, the faces of the mandrel-and/or of the nozzle ring that define the opening gap are embodied in the form of conical surfaces. The faces each have a different conicity from one another.

In an advantageous variant embodiment of the invention, at least one docking point for the outlet of an extruder is provided on the extrusion element. The suspension element is free of channels and connections for the composition to be extruded. As a result, special sealing provisions between the suspension element and the extrusion element are unnecessary. The liquefied plastic granulate need merely be kept in the flowable, extrudable state in the extrusion element. No special precautions are needed in the suspension element.

An extrusion blow molding machine that can be adapted advantageously and simply to the required given conditions has an extrusion head, and in particular an extrusion head divided into a suspension element and an extrusion element. The suspension element is mounted in a housing part of the machine and is disposed to be movable in all three coordinate directions. In this variant embodiment of the extrusion blow molding machine, the extrusion element is pivotably connected to the extruder.

In an advantageous refinement of the extrusion blow molding machine equipped with an extrusion head of the invention, the extruder is pivotably supported, to facilitate the movability of the extrusion element in all three coordinate directions.

BRIEF DESCRIPTION OF THE DRAWINGS

The invention is described in further detail below with reference to the schematic drawings. Shown schematically and not to scale are.

DETAILED DESCRIPTION OF THE PREFERRED EMBODIMENTS

Figure 1:
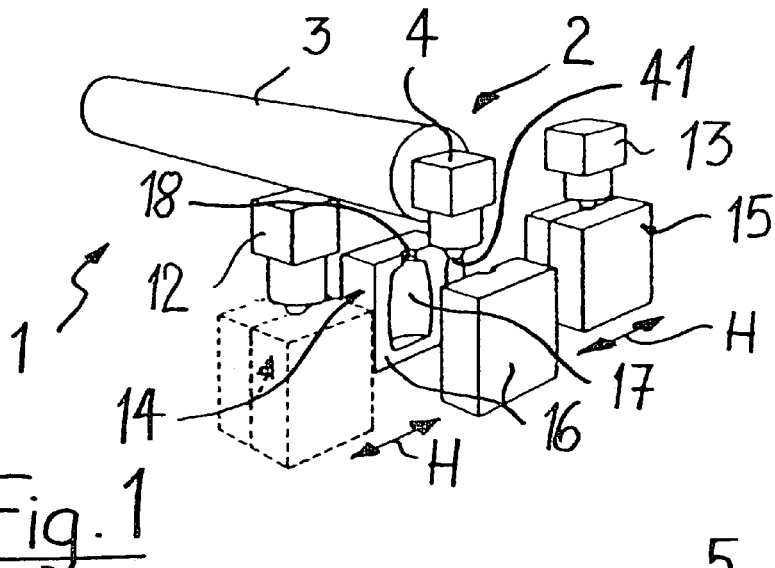
FIG. 1, a basic illustration of an exemplary extrusion blow molding machine, with an extrusion unit and two blow molding stations.

An exemplary extrusion blow molding machine, shown only basically in FIG. 1, is identified overall by reference numeral 1. The general structure of such extrusion blow molding machines is well known and is described for instance in "Blow molding handbook", edited by Donald V. Rosato and Dominick V. Rosato, 1989, ISBN 1-56990-089-2, Library of Congress Catalog Card No. 88-016270. The illustration in FIG. 1 is therefore limited to those components of the extrusion blow molding machine 1 that are necessary for comprehension of exemplary embodiments of the present invention. The machine is for instance a two-station blow molding machine, of the kind also sold by the present applicant. It has an extrusion unit 2 and two blow molding stations 12, 13. The extrusion unit 2 includes an extruder for plastic granulate and an extrusion head 4, communicating with it, which has at least one extrusion nozzle 41. The longitudinal extent of the extruder 3 defines a longitudinal direction of the extrusion blow molding machine 1. Each of the blow molding stations 12, 13 has one blow molding head and one blow molding mandrel. Each blow molding station 12, 13 is equipped with a blow molding table 14, 15, in which the molding tools 16 are mounted. Each of the molding tools encloses a cavity 17, which corresponds in shape to that of the container, such as a bottle, to be produced, and on its top toward the extrusion head 4, each molding tool has an opening 18. The blow molding tables 14, 15 are displaceable in alternation from their lateral terminal positions into a position in which the opening 18 of the molding tool 16 coincides vertically with the extrusion nozzle 41. The lateral displacement of the blow molding tables 14, 15 is effected essentially perpendicular to the longitudinal direction of the extrusion blow molding machine 1.

The plastic granulate supplied via the extruder 3 is melted in the extruder 3 and/or in the extrusion head 4 and is extruded as an endless flexible tube at the extrusion nozzle 41. The flexible tube can be extruded in a single layer or multiple layers. To that end, additional extruders, which transport the requisite different plastic materials to the extrusion head 4, can also be provided. The blow molding tables 14, 15 with the molding tools 16 are moved in alternation from their terminal positions into the blow molding stations 12, 13 laterally beneath the extrusion head 4; the molding tools 16 are opened, and a piece of extruded flexible tube is retrieved. After that, the applicable blow molding table 14, 15 is moved back into its terminal position in the blow molding station 12, 13. There, with the aid of a blow molding mandrel introduced through the opening 18 into the cavity, the container is inflated. The finished container is expelled, and the cycle is repeated. While one container is being inflated in one blow molding station 12, the blow molding table 15 in the second blow molding station 13 is moved laterally beneath the extrusion head 4, in order to retrieve a further piece of the extruded flexible tube. In this way, continuous operation is made possible.

Figure 2:
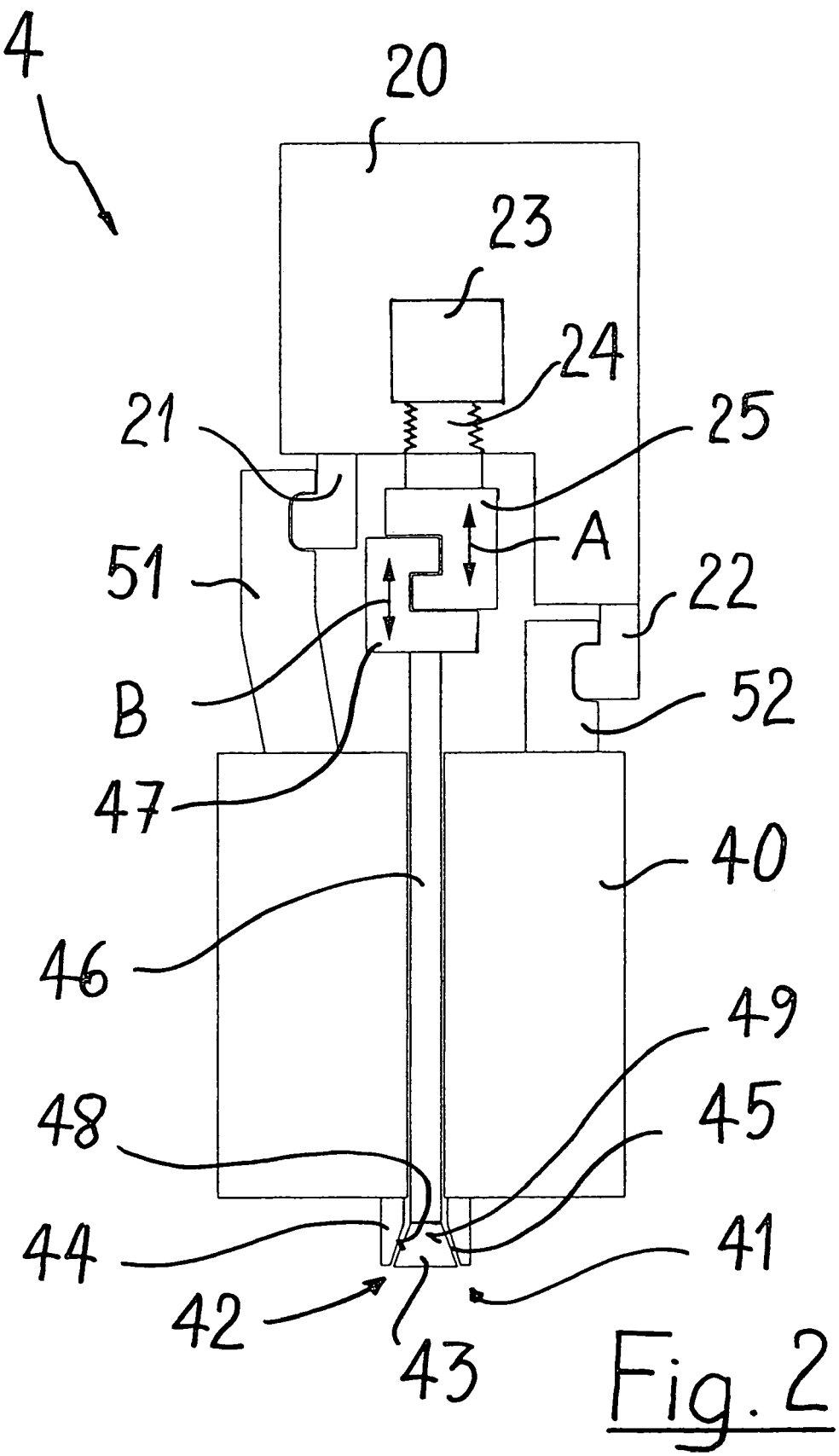
FIG. 2, a schematic illustration in axial section of an exemplary extrusion head with a suspension element and an extrusion element.

FIG. 2 is a schematic illustration of an exemplary extrusion head 4, embodied according to the invention, in axial section. It can be seen that the extrusion head 4 has a suspension element 20 and, detachably connected to it, an extrusion element 40. The two parts are joined together by positive engagement via connecting parts 21, 22 on the side toward the suspension and connecting elements 51, 52 on the side toward the extrusion element. For instance, the connecting parts 21, 22 on the side toward the suspension are steel profiles bent in an L and protruding from the underside of the suspension element 20, which engage corresponding grooves in the connecting elements 51, 52 protruding from the top of the extrusion element. For assembling the extrusion element 40, the steel profiles are thrust into one another.

The extrusion element 40 is equipped with the extrusion nozzle 41. The extrusion nozzle is formed by a nozzle tool 42, which includes a mandrel 43 and a nozzle ring 44 surrounding the mandrel. The inside face 48 of the nozzle ring 44 and the jacket face 49 of the mandrel 43 define an annular opening gap 45 of the extrusion nozzle 41, through which gap the flexible plastic tube emerges. Advantageously, the two faces 48, 49 defining the opening gap 45 are embodied conically. The inside face 48 of the nozzle ring 44 and the jacket face 49 of the mandrel 43 have different conicities. The width of the opening gap 45 is variable by means of an axial relative motion between the mandrel 43 and the nozzle ring 44. All the connections and flow channels for the liquefied plastic can be disposed in the extrusion element 40 of the extrusion head 4. However, for the sake of simplicity, they have not been shown in FIG. 2.

In the exemplary embodiment shown in FIG. 2, the adjustment of the opening width is effected by means of an axial adjustment of the mandrel 43 relative to the nozzle ring 44 that is fixed on the extrusion element 40. To that end, the mandrel 43 is connected to a control rod 46, which extends axially through the extrusion element 40 and is secured, on its end toward the suspension element, to a control bar 47. The control bar 47 of the extrusion element 40 meshes by positive engagement with a corresponding control bar 45 on the side toward the suspension element. By way of example, the control bars 47, 25 are embodied as approximately L-shaped rails, which depending on their length can be thrust into one another or suspended from one another. The control bar 25 on the side toward the suspension element is secured to a hoist 24, which is axially adjustable in height by way of an electric or hydraulic actuating drive represented in FIG. 2 by reference numeral 23. This adjustment is represented in FIG. 2 by the double arrow A. The actuating drive 23 is disposed on the suspension element 20 and is connected to a control unit. Because of the positive-engagement coupling, the axial height adjustment of the control bars 25, 47 is transmitted to the control rod 46 and to the mandrel 43, thus changing the opening width of the opening gap 45. This is represented in FIG. 2 by the double arrow B. As a result, the wall thickness of the extruded flexible plastic tube can be controlled. In the case of a multiple tool, a plurality of control rods can be mounted on the control bar 47, and these control rods can in turn be connected to a plurality of mandrels. In this way, a plurality of flexible plastic tubes can be made simultaneously. For varying the opening width of the extrusion nozzles, a single actuating drive 23, by way of which the control bar 25 toward the suspension element can be axially raised and lowered, suffices.

Figure 3:
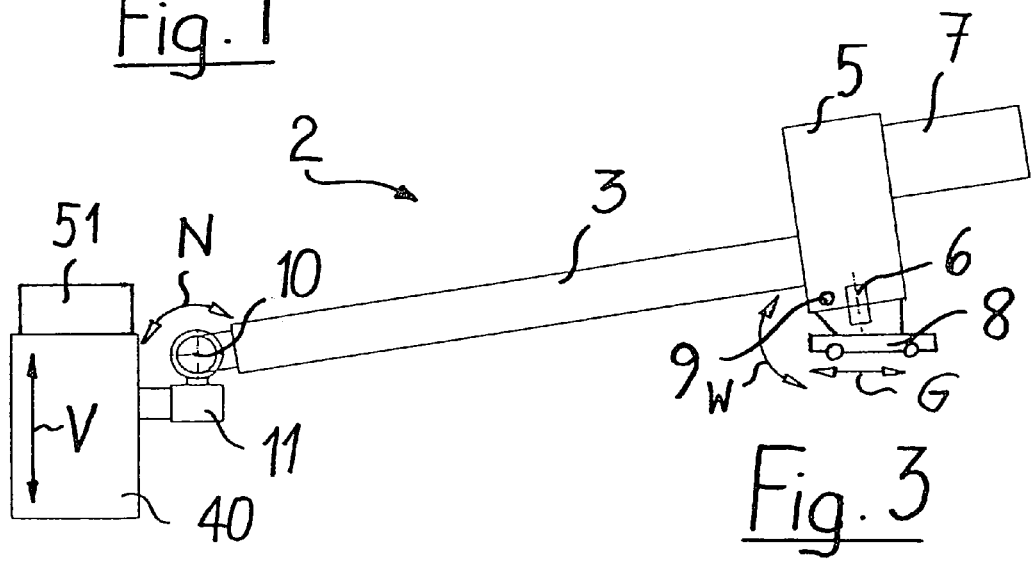
FIGS. 3 and 4, two schematic illustrations of an exemplary extrusion element communicating with an extruder.
Figure 4:
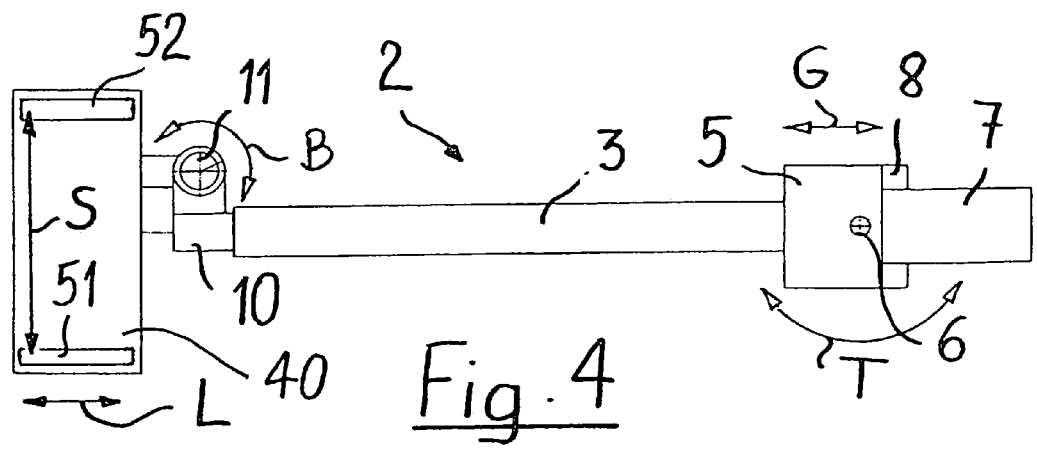

The outlet of the extruder is flanged to the extrusion element 40. FIGS. 3 and 4 show one such extrusion unit 2 of an extrusion blow molding machine according to an exemplary embodiment of the invention schematically in a side view and plan view, respectively. The extrusion unit 2 is formed by the extruder 3 and the extrusion element 40 that communicates with the outlet of the extruder 3. The extruder unit 2 is balanced in such a way that its center of gravity is located essentially in the region of the gear for the extruder 3. The gear is disposed in a gearbox 5. As a counterweight to the extruder 3, a drive unit 7 for the extruder 3 is flanged to the gearbox 5.

The entire extrusion unit 2 is pivotably supported in the housing of the extrusion blow molding machine and is also displaceable in the longitudinal direction. The pivotable support is effected in the region of the gear for the extruder 3. To that end, a vertical extruder joint 9 is provided on the gearbox 5 and allows a vertical inclination of the extruder 3. The vertical mobility is represented in FIG. 3 by the double arrow W. The gearbox 5 is disposed on a guide carriage 8 and is pivotable essentially horizontally about a shaft 6. The horizontal pivotability is indicated in the plan view of FIG. 4 by the double arrow T. The guide carriage 8 is guided, for instance via rollers or wheels, on rails that are provided on a platform of the extrusion blow molding machine and extend longitudinally of the machine. The guide carriage 8 makes a simple, controlled displaceability of the extrusion unit 2 possible in the longitudinal direction, which is represented in both FIGS. 3 and 4 by the double arrow G. By means of the selected type of support, the extrusion unit 2 is movable vertically and laterally and can also be displaced in controlled fashion longitudinally of the extrusion blow molding machine.

The extrusion element 40 is pivotably connected to the extruder 3. The pivot connection has two degrees of freedom and makes both a vertical and a substantially lateral pivotability of the extrusion element 40 relative to the extruder 3 possible. The pivot connection is formed for instance by two tubular joints 10, 11, extending essentially perpendicular to one another. The vertical inclinability of the extrusion element 40 in the vertical tubular joint 10 is represented, in the side view of FIG. 3, by the double arrow N. In FIG. 4, the double arrow B represents the horizontal pivotability of the extrusion head about the tubular joint 11. The extrusion element 40 is connected by positive engagement to the suspension element, not shown, which is suspended in a frame part of the housing of the extrusion blow molding machine in such a way that adjustability in all three coordinate directions exists. Because of the pivot connection of the extrusion element 40 to the extruder 3 on the one hand, and the support of the extrusion unit 2 that is both pivotable and longitudinally displaceable, the motions of the extrusion element 40 are converted into tilting/pivoting motions of the extruder 3, and the following sequences of motion result:

a vertical motion of the extrusion element 40 in the direction of the double arrow V leads to a slight inclination represented by the double arrow N in the tubular joint 10 and a slight inclination W in the extruder joint 9 as well as a longitudinal displacement indicated by the arrow G;

a horizontal motion of the extrusion element 40 perpendicular to the longitudinal direction, in the direction of the double arrow S, leads to a rotation in accordance with the double arrow B in the tubular joint 11, a rotation T in the extruder joint 6, and a longitudinal displacement G;

a horizontal motion of the extrusion element 40 in the longitudinal direction L results in a longitudinal displacement G of the carriage support of the extrusion unit 2.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An extrusion head for producing a plastic strand formed as a flexible or rigid tube, and for communicating with an outlet of an extruder, comprising:
   a nozzle tool that includes a mandrel and a nozzle ring, which define an opening gap;
   an actuating drive for controlling an opening width of the opening gap which is varied by an axial relative motion between the mandrel and the nozzle ring; and
   a suspension element and an extrusion element, detachably connected to the suspension element, which extrusion element has connections and flow channels for a plastic composition to be extruded and is equipped with the nozzle tool, the actuating drive being disposed on the suspension element and detachably connectable to one of the mandrel and the nozzle ring.

2. The extrusion head of claim 1, wherein the actuating drive is connected to the mandrel via a control rod, and adjustment of the opening width of the opening gap of the nozzle tool is effected by means of an axial adjustment of the mandrel.

3. The extrusion head of claim 2, wherein a connection between the suspension element and the extrusion element and between the actuating drive and the control rod is a positive-engagement connection.

4. The extrusion head of claim 3, wherein the connection between the actuating drive and the control rod is effected via two control bars positively engaging one another.

5. The extrusion head of claim 4, wherein the extrusion element has a number of nozzle tools, and a number of control rods corresponding to the number of nozzle tools is mounted on the control bar located toward the extrusion element.

6. The extrusion head of claim 1, wherein faces of the mandrel and/or of the nozzle ring that define the opening gap are embodied as conical faces having a different conicity from one another.

7. The extrusion head of claim 1, wherein the extrusion element is equipped with at least one docking point for an outlet of an extruder.

8. An extrusion blow molding machine having, in combination, an extruder and the extrusion head of claim 1.

9. The extrusion blow molding machine of claim 8, wherein the suspension element is mounted in a housing part of the machine and is movable in three coordinate directions, and the extrusion element is pivotably connected to the extruder.

10. The extrusion blow molding machine of claim 9, wherein the extruder is pivotably supported.

* * * * *